United States Patent
An et al.

(10) Patent No.: US 9,648,773 B1
(45) Date of Patent: May 9, 2017

(54) CARRIER WITH LIFTING AND SECURING LEVER AND MINIMIZED FOOTPRINT

(71) Applicant: ZT Group Int'l, Inc., Secaucus, NJ (US)

(72) Inventors: Chen An, Bogota, NJ (US); Cong Yao, Lyndhurst, NJ (US)

(73) Assignee: ZT GROUP INT'L, INC., Secaucus, NJ (US)

( * ) Notice: Subject to any disclaimer, the term of this patent is extended or adjusted under 35 U.S.C. 154(b) by 0 days.

(21) Appl. No.: 15/164,017

(22) Filed: May 25, 2016

(51) Int. Cl.
*G06F 1/16* (2006.01)
*H05K 7/14* (2006.01)
*H05K 7/20* (2006.01)
*G06F 1/18* (2006.01)

(52) U.S. Cl.
CPC ........... *H05K 7/1409* (2013.01); *G06F 1/187* (2013.01); *H05K 7/1487* (2013.01); *H05K 7/1489* (2013.01); *H05K 7/20736* (2013.01)

(58) Field of Classification Search
CPC ....................................................... G06F 1/187
See application file for complete search history.

(56) References Cited

U.S. PATENT DOCUMENTS

| | | | | |
|---|---|---|---|---|
| 5,077,722 A * | 12/1991 | Geist | ..................... | G11B 33/121 360/137 |
| 5,654,873 A * | 8/1997 | Smithson | ................ | G06F 1/181 361/679.37 |
| 5,791,753 A * | 8/1998 | Paquin | .................. | H05K 7/1411 312/223.1 |
| 6,404,641 B1 * | 6/2002 | Fisk | ......................... | G06F 1/184 312/332.1 |
| 6,616,106 B1 * | 9/2003 | Dean | ....................... | G06F 1/184 248/27.1 |
| 6,816,367 B2 * | 11/2004 | Liu | ........................... | G06F 1/187 248/200 |
| 7,684,179 B1 * | 3/2010 | Lima | ..................... | H05K 7/1411 361/679.33 |
| 8,289,695 B2 * | 10/2012 | Wu | ........................ | G06F 1/1658 361/679.33 |
| 8,807,488 B2 * | 8/2014 | Lee | ........................ | G06F 1/187 248/222.51 |
| 2002/0122294 A1 * | 9/2002 | Mercer | ................... | G06F 1/184 361/679.34 |
| 2006/0171110 A1 * | 8/2006 | Li | ........................... | G06F 1/184 361/679.37 |
| 2008/0123280 A1 * | 5/2008 | Chen | ....................... | G06F 1/187 361/679.33 |
| 2009/0212182 A1 * | 8/2009 | Ding | ........................ | G06F 1/187 248/225.11 |
| 2011/0289521 A1 * | 11/2011 | Chen | .................... | G11B 33/124 720/601 |
| 2015/0327414 A1 * | 11/2015 | Jau | ...................... | H05K 13/0084 206/701 |

* cited by examiner

*Primary Examiner* — Adrian S Wilson
(74) *Attorney, Agent, or Firm* — Dergosits & Noah LLP; Todd A. Noah (57) ABSTRACT

A carrier is disclosed for securing a computer drive within a chassis. The carrier provides improved access to the computer drive and drive connector using a lever and lifting pins. The lever and pins cooperate to lift the computer drive and the lifted access allows such carriers to be positioned with minimal separation, increasing the potential density of computer drives within the chassis. The lifted access also assists with computer drive maintenance.

20 Claims, 10 Drawing Sheets

CARRIER WITH LIFTING AND SECURING LEVER AND MINIMIZED FOOTPRINT

BACKGROUND

A carrier is typically used to secure a hard disk drive (HDD) within a chassis, preventing movement of the HDD. The chassis may itself be configured to secure a number of carriers and HDDs. For example, carriers may be used to hold several HDDs within a server chassis. Such carriers may also be called "trays" or "caddys."

A chassis may be of arbitrary width and length, but they may be found with dimensions of, for example: width 447 mm and length 906 mm. And HDDs also vary in dimension, with 3.5", 2.5", and 1.8" being common, but 8" drives and 5.25" drives have also been common. Space in the chassis is typically limited.

Traditional methods provide for the manual installation and removal of an HDD within a carrier—the use of fingers. Often, tools are also required. Because of this, traditional carrier configurations within a chassis require approximately an inch of space between carriers for accessing the HDD during installation and removal.

A problem with such manual removal of an HDD may results from a lack of skill in a technician. HDDs are shock and impact sensitive. Clumsy or even marginally less than adroit technicians may, particularly with repeated removal and installation, damage the HDD or its connection.

A problem with such manual removal is also the approximate inch of space required for using fingers. Such inches may add up to unnecessarily limit the HDD capacity of a chassis.

Therefore, the need exists for a carrier that provides for the gentle removal of an HDD from the carrier, and that minimizes the need for separation between carriers.

DETAILED DESCRIPTION

A carrier's typical function is to secure an HDD in a chassis. In an embodiment, a carrier performs a number of functions. First, a lever assists in securing the HDD by preventing it from popping up. That is, the lever has a flange that, when the lever is lowered (pivoted closed), assists in securing the HDD within the carrier. Second, the lever is equipped with pins that lift the connector end of the HDD through an angle when the lever is raised (pivoted open). Movement of the lever causes the pins to move in an arc through a slot in the carrier. Pin movement in an upwards direction results in the lifting of the HDD. Pin movement in a downward direction results in the lowering of the HDD. The lifting allows for access to and easy, tool-less removal of the HDD. Third, the lifting also allows for easy access to the HDD connector, which may be connected or disconnected without the use of tools. And fourth, the lifting, the resulting improved access, and the lever configuration also allow multiple carriers (and therefore HDDs) to be situated closer together within a chassis. This allows HDDs to be more densely packed within the limited space of the chassis and may allow more HDDs to be packed within the chassis.

In an embodiment, a carrier includes a frame dimensioned to receive a computer drive and define a computer drive position with respect to a plane of the frame. In the embodiment, the frame has a connector end dimensioned to accommodate a drive connector, and the frame has a slot towards or in the connector end. The carrier includes a lever pivotally connected to the frame at a pivot point, with the lever having a lifting pin positioned a radius from the pivot point. The lifting pin, pivot point, radius, and slot are dimensioned so that as the lever pivots from a closed position substantially adjacent to the frame to an open position away from the frame the lifting pin moves through the slot. The movement of the lifting pin through the slot is an arc, with a component of that arc being away from the plane of the frame.

With such an embodiment of a carrier, if a computer drive is actually secured by the carrier, the movement of the lever from the closed position to the open position causes the pins to lift the connector end of the computer drive.

In an embodiment, a chassis for positioning and cooling a plurality of computer drives includes a plurality of carriers for accessing and holding a corresponding plurality of computer drives within the chassis. In the embodiment, each carrier of the plurality includes a frame dimensioned to receive a computer drive and define a computer drive position with respect to a plane of the frame. In the embodiment, the frame has a connector end dimensioned to accommodate a drive connector, and the frame has a slot towards or in the connector end. The carrier includes a lever pivotally connected to the frame at a pivot point, with the lever having a lifting pin positioned a radius from the pivot point. The lifting pin, pivot point, radius, and slot are dimensioned so that as the lever pivots from a closed position substantially adjacent to the frame to an open position away from the frame the lifting pin moves through the slot. The movement of the lifting pin through the slot is an arc, with a component of that arc being away from the plane of the frame. The embodiment further includes a structure separating the frame a distance from the chassis, with one or more fans positioned in the chassis. The fans have access to the distance separating each carrier from the chassis, allowing the fans to cause air to flow through that distance and assist with cooling the chassis.

In an embodiment, a chassis positioning a plurality of computer drives in a minimal area includes a plurality of carriers for holding and providing access to a corresponding plurality of computer drives within the chassis. In the embodiment, each carrier of the plurality includes a frame dimensioned to receive a computer drive and define a computer drive position with respect to a plane, the frame having a connector end dimensioned to accommodate a drive connector, and the frame having a first slot towards or in the connector end. Each carrier also includes a lever pivotally connected to the frame at a pivot point with the lever having a lifting pin positioned a radius from the first pivot point. The lifting pin, pivot point, radius, and slot are dimensioned so that as the lever pivots from a closed position substantially adjacent to the frame to an open position away from the frame the lifting pin moves through the slot, a component of the movement being away from the plane. The chassis further includes a first drive connector on a first computer drive in a first carrier of the plurality and a second computer drive in a second carrier of the plurality, with the first carrier and the second carrier being positioned so that, as the lever of the first carrier moves to the open position the lifting pin of the first carrier moves through the slot of the first carrier and urges a connector end of the first computer drive away from the plane, the first drive connector becomes accessible for connecting to or disconnecting from only as the first lever of the first carrier approaches the open position.

Figure 1:
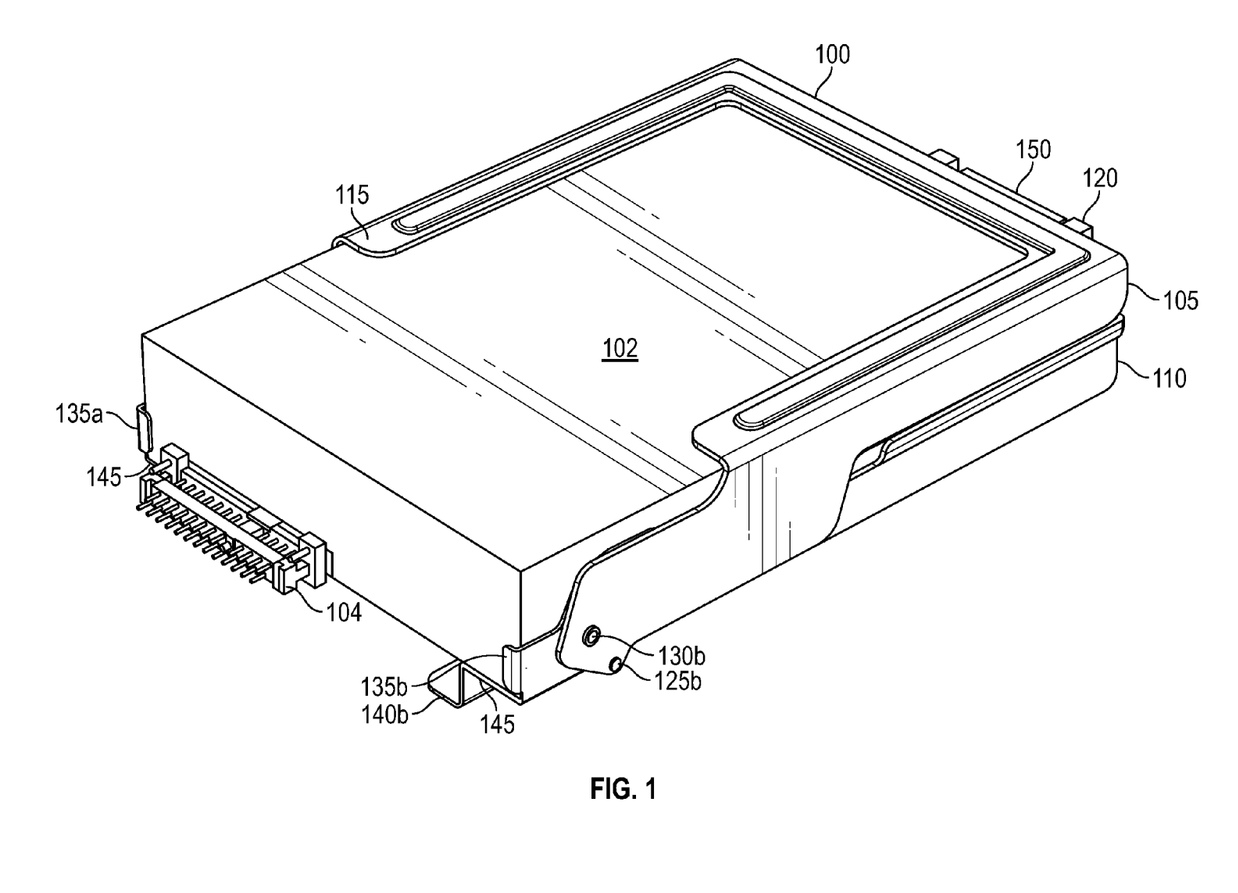
FIG. 1 is a perspective drawing illustrating a carrier of an embodiment securing an HDD.

FIG. 1 is a perspective drawing illustrating a carrier 100 of an embodiment securing an HDD 102. In FIG. 1, HDD 102 includes a connector 104. Carrier 100 includes a lever 105 and a frame 110. Lever 105 includes a flange 115, a latch piece 120, pins 125$a$ (FIG. 4B), 125$b$, and pivots 130$a$ (FIG. 4B), 130$b$. Frame 110 includes corners 135$a$, 135$b$, a flange 145, feet 140$a$ (FIG. 4A), 140$b$, and a latch piece 150.

FIG. 1 shows lever 105 in a closed position with flange 115 against HDD 102. HDD 102 itself rests on flange 145 of frame 110. HDD 102 is constrained within a plane parallel to flange 145 (the horizontal plane in this view) by corners 135$a$, 135$b$ and frame 110. HDD 102 is constrained from moving perpendicularly to that horizontal plane by flange 145 and flange 115 (when flange 115 is in the closed position as shown). With lever 105 in this closed position, latch pieces 120, 150 may engage with each other to hinder the movement of lever 105 and, thereby, secure HDD 102 within carrier 100.

The end of HDD 102 to which connector 104 is attached will be referred to as the connector end. And the end of HDD 102 to which latch pieces 120, 150 are attached will be referred to as the latch end. With the release of latch pieces 120, 150, lever 105 may be raised at the latch end and caused to pivot at pivot points 135$a$, 135$b$ with respect to frame 110. This pivoting causes pins 125$a$, 125$b$ to move upward in an arc within arc-shaped slots (not shown) within frame 110. At some initial point in this arcing movement, pins 125$a$, 125$b$ come against HDD 102 and, with the continued movement of lever 105, pins 125$a$, 125$b$ cause the connector end of HDD 102 to move away from flange 145. At some point, the continued movement of lever 105 away from frame 110 causes pins 125$a$, 125$b$ to lift the connector end of HDD 102 far enough to clear corners 135$a$, 135$b$. At that point, connector 104 is placed in an advantageous position for access (particularly if access to connector 104 was hindered when HDD 102 was secured, that is, with HDD 102 in carrier 100 with lever 105 closed and latched). At that point, HDD 102 may also be withdrawn from carrier 100 by lifting HDD 102 from frame 110.

Figure 3A:
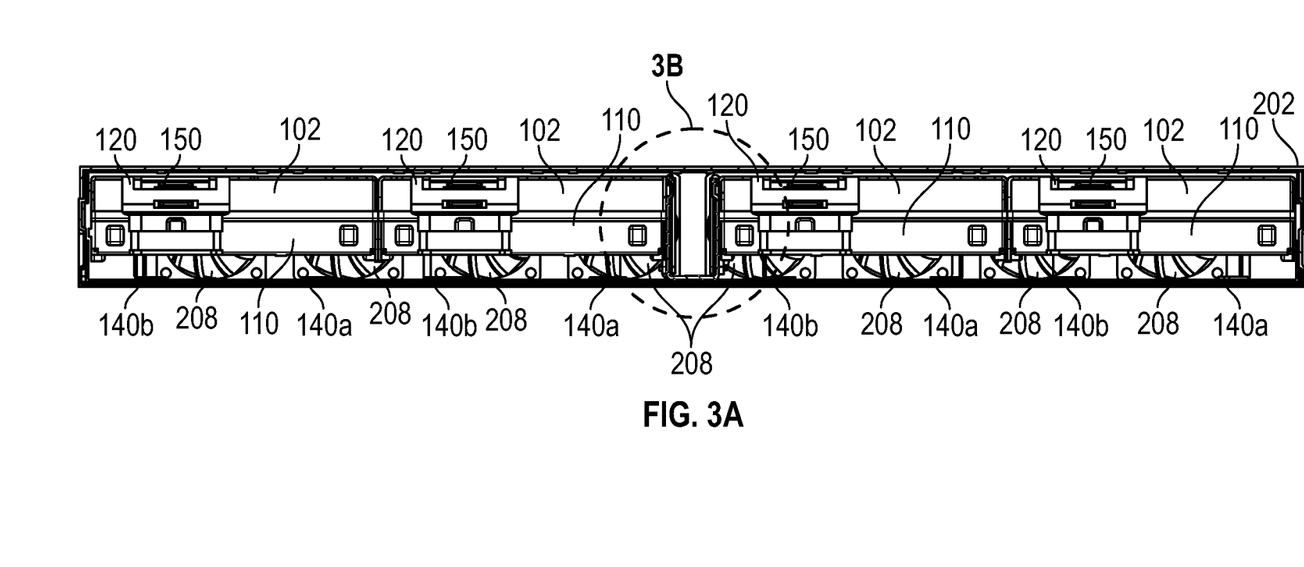
FIG. 3A is a drawing illustrating the cross-section along line A-A' of FIG. 2.
Figure 4A:
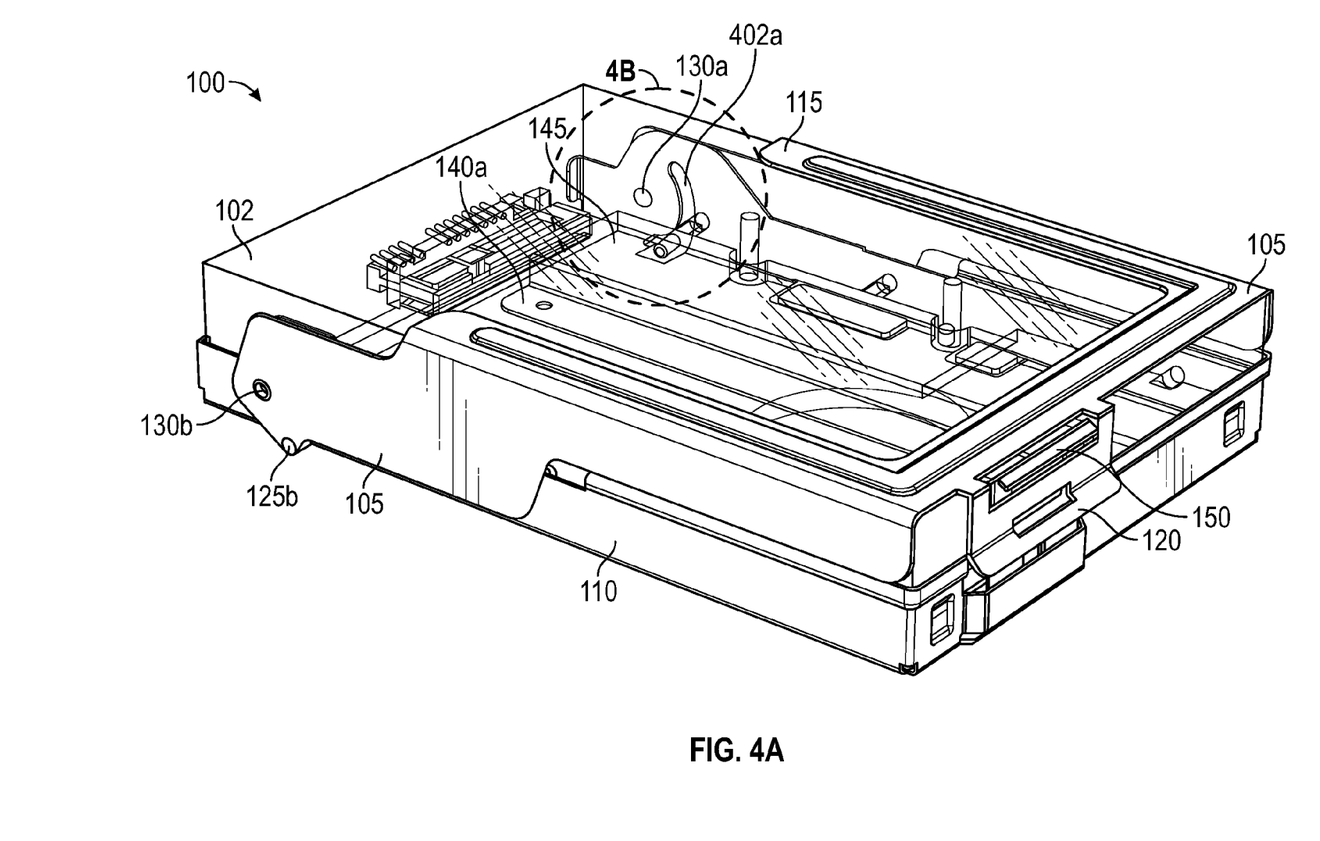
FIG. 4A is a perspective drawing illustrating a carrier of an embodiment.
Figure 4B:
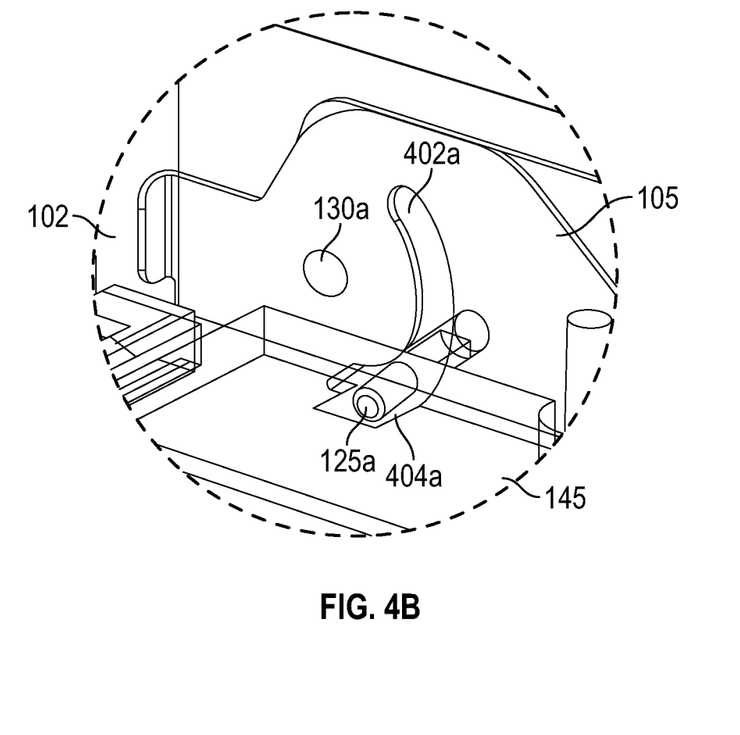
FIG. 4B is a drawing further illustrating section C of FIG. 4A.
Figure 5A:
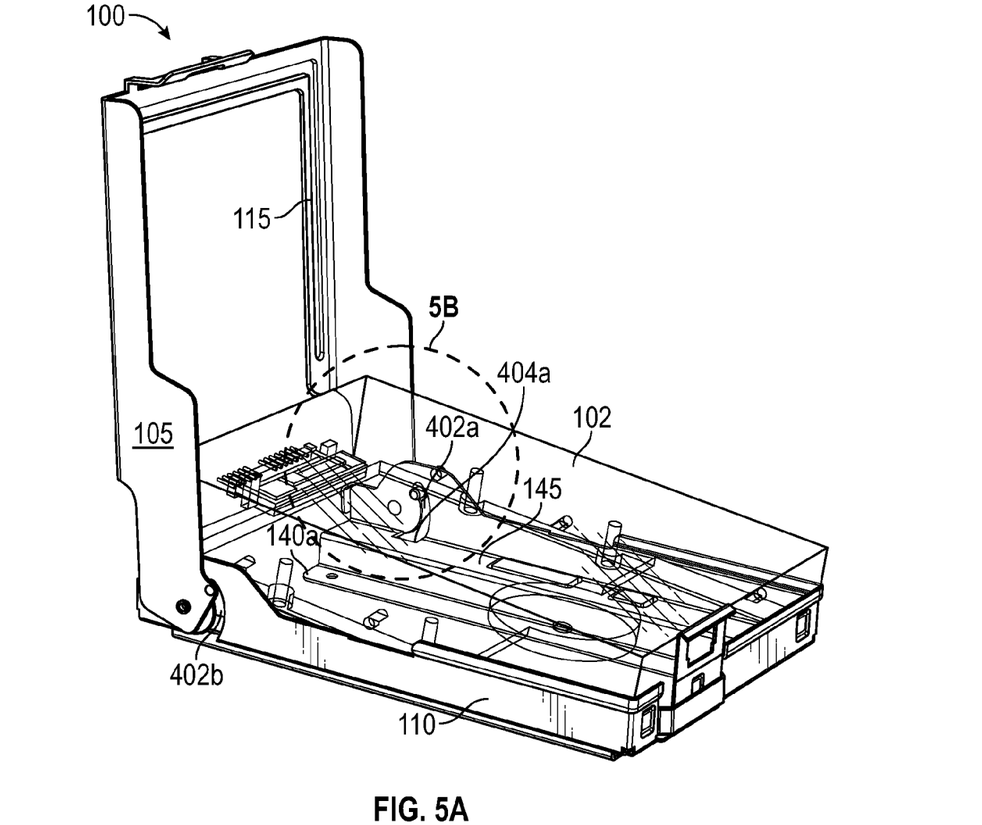
FIG. 5A is a perspective drawing illustrating a carrier of an embodiment.
Figure 5B:
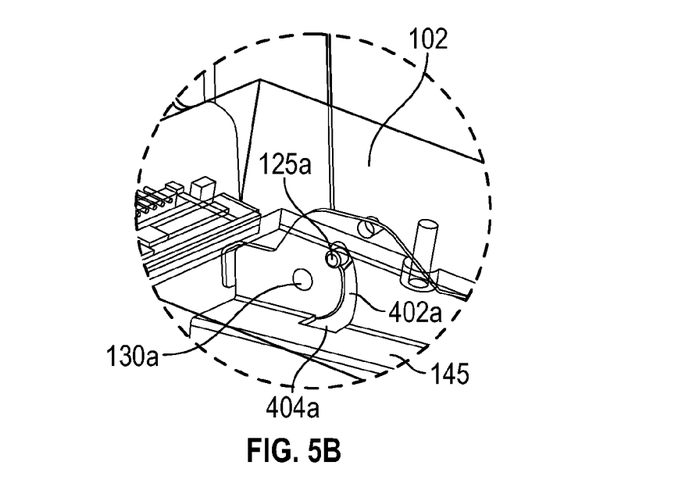
FIG. 5B is a drawing further illustrating section D of FIG. 5A.
Figure 6:
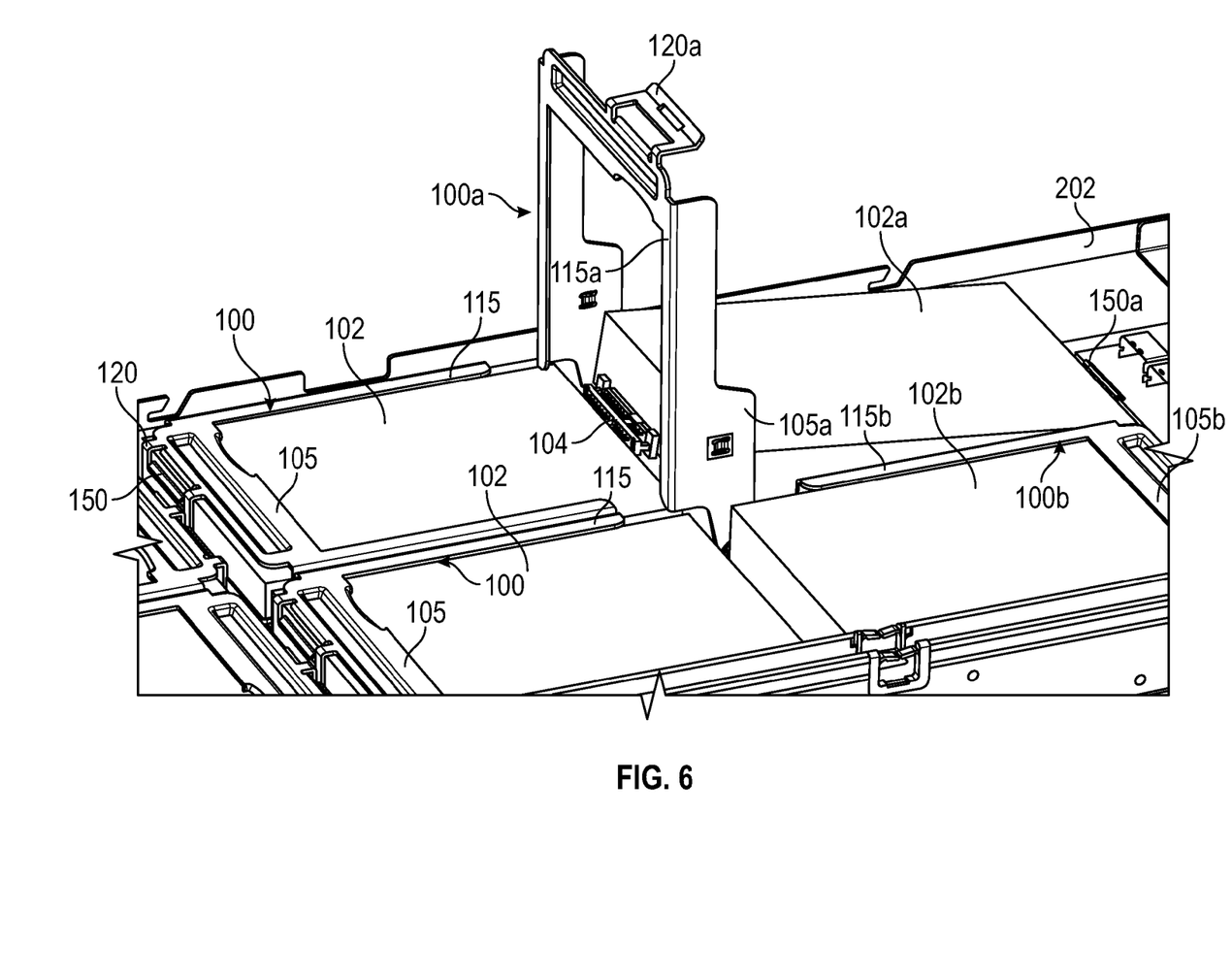
FIG. 6 is a perspective drawing illustrating an embodiment with a plurality of carriers and HDDs within a chassis.

The benefits of lifting lever 105 and thereby improving access to connector 104 and HDD 102 in general will be explored in more detail with reference to FIGS. 4-6. Feet 140$a$, 140$b$ will be discussed further with respect to FIG. 3A.

Figure 2:
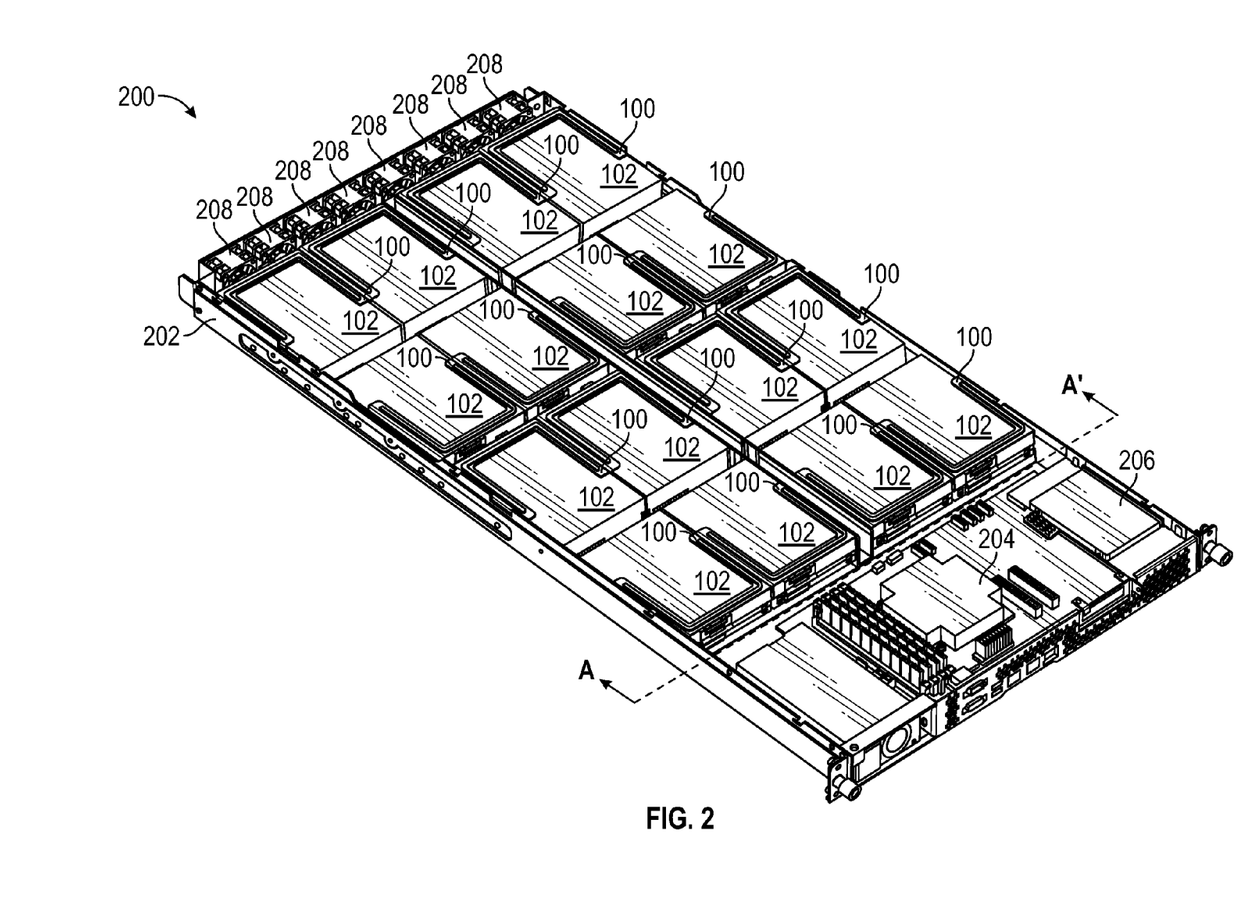
FIG. 2 is a perspective drawing illustrating an embodiment with a plurality of carriers and HDDs within a chassis.

FIG. 2 is a perspective drawing illustrating an embodiment of a server 200 with a plurality of carriers 100 and HDDs 102 within a chassis 202. In FIG. 2, server 200 further includes a plurality of cooling fans 208, a solid state drive (SSD) 206 (a second SSD, not shown, is beneath SSD 206), and a power supply 204.

Note that in FIG. 2, the connector end of each HDD 102 is facing the connector end of another HDD 102. Since the connectors are in the same place on each HDD 102, rotating one HDD 102 so that its connector end faces the connector end of another HDD 102 allows each pair of HDDs to be separated by a minimal amount. This minimal spacing allows HDDs to be more densely packed in chassis 202, but this minimal spacing also makes it more difficult to access connectors 104 when an HDD 102 is secured within a carrier 100 whose lever 105 is in the closed position. Access to a connector 104 may then be obtained by pivoting lever 105 away from frame 110 and, in so doing, raising the connector end of the drive 102.

In server 200, HDDs 102 may be, for example, 3.5" hard disk drives, each with exterior dimensions width 101.6 mm×height 26.111 mm×146.99 length mm (4.0"×1.028"× 5.787"), chassis 202 may have dimensions of width 447 mm×length 906 mm, fans 208 may be 28 mm, and power supply 204 may be a Delta 400$w$ power supply. Connections to each drive 102 may be made using ribbon connectors and run through the central channel (the channel seen leading from fans 208 to power supply 204, which is shown in more detail in FIG. 3B). One skilled in the art would appreciate that chassis having other dimensions may be used and that the dimensions set forth above are used as an example.

FIG. 3A is a drawing illustrating the cross-section of server 200 along line A-A' of FIG. 2. In FIG. 3A, each frame 110 is separated from the lower surface of chassis 202 by L-shaped feet 140$a$, 140$b$. Elements of fans 208 are visible in the space caused by the separation. Fans 208 are able to assist with cooling drives 102 by causing air to flow within the separation between frames 110 and chassis 202. Feet 140$a$, 140$b$ are in contact with frame 110 and chassis 202. Feet 140$a$, 140$b$ may assist with cooling drives 102 by conducting heat away from frames 110 towards chassis 202. Feet 140$a$, 140$b$ may also assist with cooling by acting as fins to increase the surface area with which the air flow caused by fans 208 may interact. Furthermore, latch pieces 120, 150 may be under tension when latched. Such tension compresses HDD 102 between lever 105 and frame 110. The compressive force may work to improve the thermal connection between HDD 102 and frame 110. Thus, carrier 100 may act as a heat sink, with feet 140$a$, 140$b$ assisting to both conduct heat to chassis 202 and to act as fins when interacting with the airflow caused by fans 208. In an embodiment, carrier 100, and chassis 202 are fabricated from a metal, such as aluminum or steel, or other material with desired heat transfer properties.

FIG. 3A illustrates an advantage of carrier 100: two such carriers 100 may be situated very closely together side-by-side, with the separation determined mainly by the thicknesses of the flat material used to fabricate frame 110 and lever 105. For example, the space between two carriers 100 situated side-by-side may be 4-5 mm. A further advantage is conferred on carrier 100 by its elegant and simple design, which uses essentially two parts (lever 105 and frame 110): the minimal structure needed below HDD 102 allows for improved air flow.

Figure 3B:
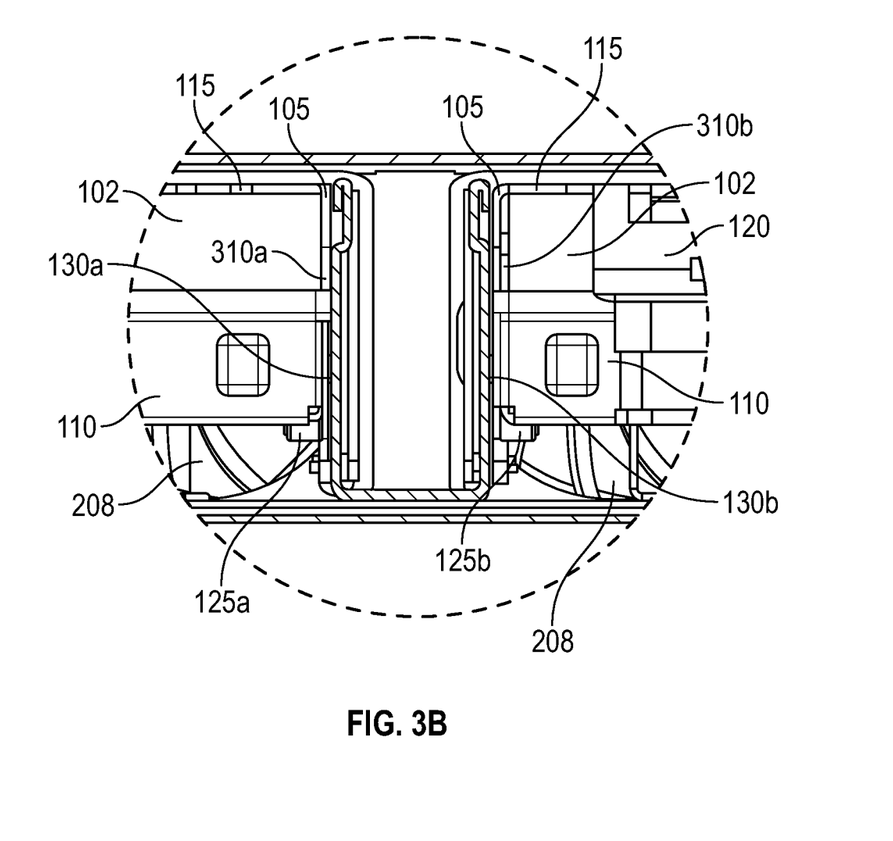
FIG. 3B is a drawing further illustrating section B of FIG. 3A.

FIG. 3B is a drawing further illustrating section B of FIG. 3A. In FIG. 3B, sides 310$a$, 310$b$ are parts of frame 110. Sides 310$a$, 310$b$ extend above the majority of frame 110 to accommodate slots 402$a$ (FIG. 4A), 402$b$ (FIG. 5$a$). The relative height of sides 310$a$, 310$b$ with respect to the other elements illustrates how far pins 125a, 125b may rise, and in doing so, how far the connector end of each HDD 102 may be lifted.

FIG. 4A is a perspective drawing illustrating carrier 100 with lever 105 in the closed position—against HDD 102. In FIG. 4A, frame 110 has slots 402a, 402b (FIG. 5A). HDD 102 is shown as a transparent box to make other elements visible and still illustrate the interaction between HDD 102 and the other elements. Slot 402a is arc-shaped to allow for the movement of pin 125a within slot 402a when lever 105 is opened or closed, the opening or closing causing lever 105 to pivot about pivot points 130a, 130b with respect to frame 110. Similarly, pin 125b moves though slot 402b (FIG. 5A) in tandem with the movement of pin 125a. FIG. 4A also shows latch pieces 120, 150 in the latched position in more detail.

FIG. 4B is a drawing further illustrating section C of FIG. 4A. In FIG. 4B, slot 402a is shown connected to a slot 404a within flange 145 of frame 110. Slots 402a and 404a are connected so that, when lever 105 pivots from the closed position (shown in FIG. 4A) to the full open position (shown in FIG. 5A) with respect to frame 110, pin 125a enters and passes through slot 404a. Pin 125a then moves within slot 402a as lever 105 continues to the full open position. Similarly, pin 125b enters and passes through slot 404b, and then moves within slot 402b as lever 105 continues to the full open position.

FIG. 5A is a perspective drawing illustrating carrier 100 with lever 105 in the full open position—with pins 125a, 125b at their limit of travel within slots 402a, 402b, respectively. Again, HDD 102 is shown as a transparent box to make other elements visible and still illustrate the interaction between HDD 102 and the other elements. In FIG. 5A, the pivoting of lever 105 to the full open position has caused pins 125a, 125b to lift the connector end of HDD 102, making connector 104 more accessible for connection or disconnection. With lever 105 in this open position (and, consequentially, flange 115 removed from contact with HDD 102), HDD 102 may be easily lifted from frame 110.

FIG. 5A illustrates a further aspect of carrier 102. When pins 125a, 125b lift HDD 102, corners 135a, 135b (FIG. 1) cooperate with the lifting action of pins 125a, 125b to move the connector end of HDD 102 essentially straight up (until HDD 102 has been lifted enough to clear corners 135a, 135b).

FIG. 5B is a drawing further illustrating section D of FIG. 5A. In FIG. 5B, with lever 105 pivoted to the full open position, pins 125a, 125b have reached the limit of possible travel within slots 402a, 402b, respectively. At this point, lever 105 is itself hindered by pins 125a, 125b from pivoting further from frame 110. This illustrates that the amount the connector end of HDD 102 may be lifted is determined by the distance pins 125a, 125b travel away from flange 145.

FIGS. 5A and 5B illustrate an aspect of carrier 100, when lever 105 is moved from the open to the closed position, the movement of pins 125a, 125b allows HDD 102 to settle in place within frame 110. The latching of latch pieces 120, 150 and flange 115 then cooperate to secure HDD within frame 110.

FIG. 6 is a perspective drawing illustrating an embodiment with a plurality of carriers 100 and HDDs 102 within a chassis 202. For comparison purposes, the carrier in the open position and the related HDD and elements have been given an "a" designation. Similarly, a carrier in the secured or closed position and the related HDD and elements have been given a "b" designation. In FIG. 6, lever 105a is shown in the full open position and, as a result, HDD 102a is shown in the lifted position with connector 104a accessible. In contrast, lever 105b is shown in the closed position and, as a result, HDD 102b is shown in the secured position and the connector is not accessible.

FIG. 6 illustrates a further advantage of carrier 100: two such carriers 100 may be situated very closely together end-to-end, with the separation determined mainly by the dimensions of the connectors, since the connectors may extend beyond the footprint of embodiments of carrier 100. A general advantage is conferred on carrier 100 by its elegant and simple design, which uses essentially two parts (lever 105 and frame 110): a reduced risk of failure.

Figure 7A:
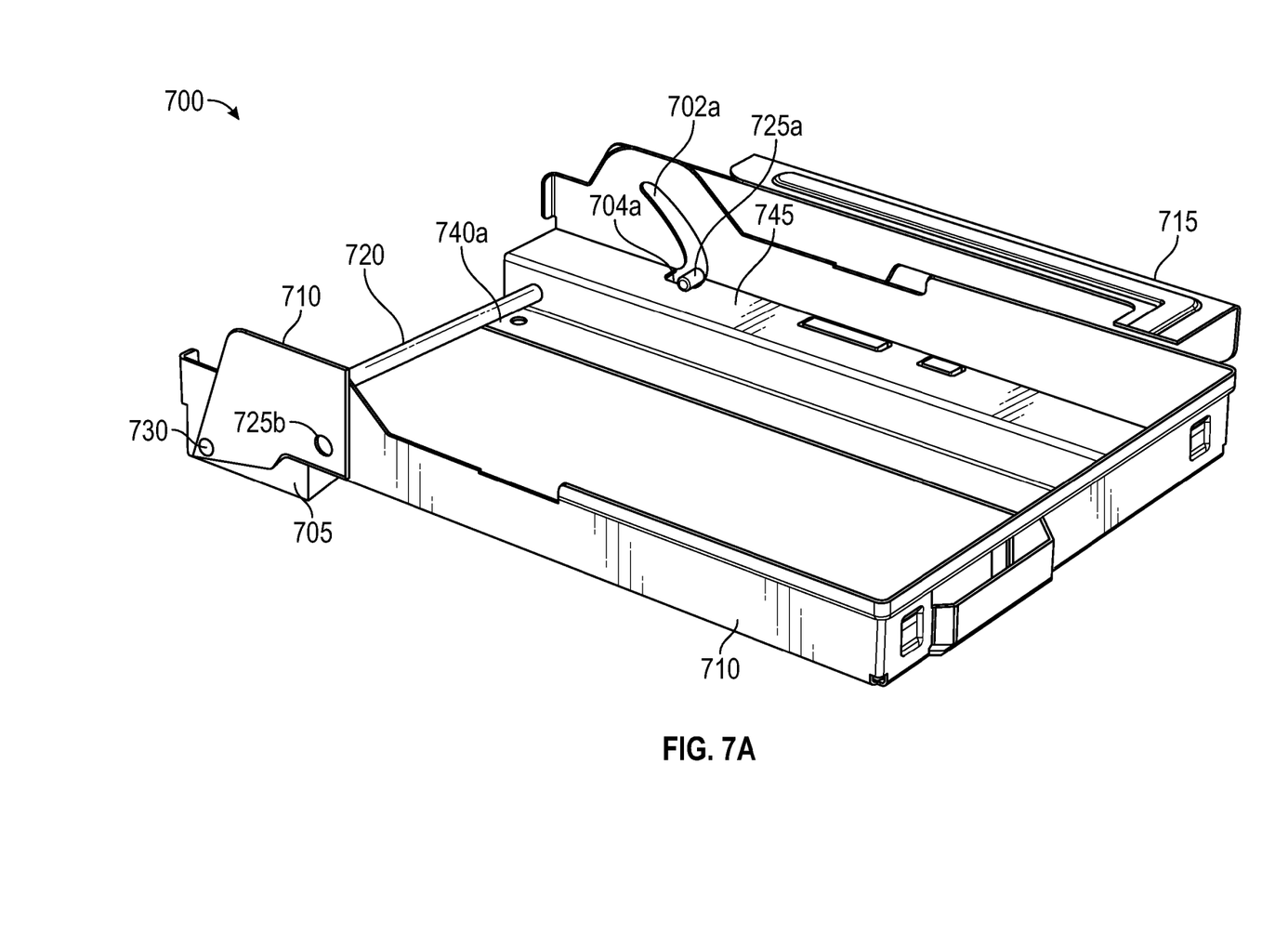
FIG. 7A is a perspective drawing illustrating a carrier of an embodiment.
Figure 7B:
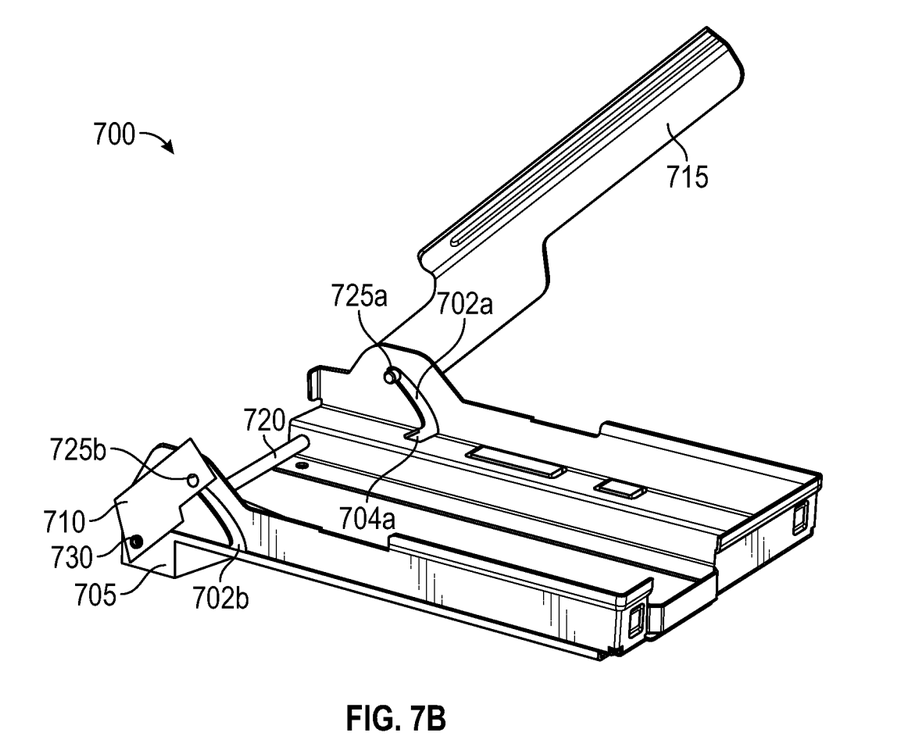
FIG. 7B is a perspective drawing illustrating a carrier of an embodiment.

FIG. 7A is a perspective drawing illustrating a carrier 700 of an embodiment in a closed position. In FIG. 7A, carrier 700 includes a frame 702, levers 710, 715, and an axle 720 (FIG. 7B). Frame 702 includes sides 705a (not shown), 705b, which extend below the majority of frame 702. In FIG. 7A, lever 715 is connected to lever 710 by axle 720, which runs through frame 702 and sides 705a, 705b as shown in FIG. 7B. The flange of lever 715 works to secure HDD 102 by preventing movement in the vertical direction—up (or "away") from frame 702.

FIG. 7B is a perspective drawing illustrating carrier 700 in an open position. In FIG. 7B, levers 715, 710 have pins 725a, 725b, respectively. Frame 702 also includes slots 402a, 402b, 404a, and 404b as previously described with respect to frame 110, which allow for the movement of pins 725a, 725b through frame 702. Levers 710, 715 are connected by an axle 720 passing through sides 705a, 705b and frame 702. Axle 720 transmits the movement of lever 715 to lever 710. Thus, levers 710, 715 rotate about a pivot point 730 in tandem. Similar to the movement of pins 125a, 125b previously discussed, pins 725a, 725b move within slots 402a, 402b, 404a, and 404b such that, when carrier 700 is loaded with HDD 102, the movement of pins 725a, 725b within slots 402a, 402b causes the connector end of HDD 102 to rise and fall. As previously discussed, access to connector 104 may be improved when the connector end of HDD 102 is lifted. In FIG. 7B, levers 710, 715 are at the limit of travel. The difference between lever 715 in the "angled" open position of FIG. 7B and lever 105 in the "vertical" open position of FIG. 5B is due to the new location of pivot point 730 with respect to pins 725a, 725b. In the open position shown in FIG. 7B, removal of HDD 102 may be accomplished by moving HDD 102 in the direction of connector 104.

In an embodiment, corners 135a, 135b (FIG. 1) may be removed from frame 110. Such corners may then be attached to levers 710, 715 (FIG. 7A). Such corners (not shown) on levers 710, 720 retain HDD 102 when levers 710, 715 are in the closed position. The corners would then pivot away from the connector end of HDD when levers 710, 715 are pivoted into the open position. Thus, in this embodiment, the movement of lever 715 from the open position to the closed position works to prevent the movement of HDD 102 in two directions—the first direction being away from frame 702 (as before in FIGS. 1-6) and the second direction being toward the connector end of HDD 102 (movement that had been previously prevented by fixed corners 135a, 135b on frame 110). In other words, the corners would be moveable and would allow the release of HDD 102 when levers 710, 715 are in the open position, and would secure HDD 102 when levers 710, 715 are in the closed position.

The examples and embodiments in this disclosure may generally reference the carriers 100 securing HDDs 102. However, reference to an HDD is merely exemplary—it is representative of the numerous devices ("modules" or "modular devices") that may be accommodated by the carrier. Other devices may be accommodated as well, both instead of HDDs and in addition to HDDs—one carrier in a chassis may contain an HDD while another carrier in the same chassis may contain a different device. For example, PCIe modules accommodated by the carrier may include one or more of: an SSD module, a Wi-Fi® module, a GPS module, a Bluetooth® module, a GSM module, an LTE module, a WiGig module, a WWAN module, a Gigabit Ethernet LAN module, a Dual Gigabit LAN module, a 2G/3G modem module, a FireWire module, a SAS Host Bus Adapter module and a SATA RAID module. Embodiments in this disclosure may also generally reference a 3.5" HDD. However, reference to a 3.5" drive bay is also merely representative of a pre-defined volume, such as the 5.25", 3.5", 2.5", and 1.8" drive bay standards.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. For example, one skilled in the art will recognize that these embodiments can be practiced without one or more of the specific details, or with other components, systems, etc. And, in other instances, there may be structures or operations not shown, or not described in detail, to avoid obscuring aspects of the described embodiments. Therefore, the scope of the appended claims should be accorded the broadest interpretation so as to encompass all such modifications and similar arrangements.

What is claimed is:

1. A carrier for holding a computer drive and lifting a connector end of the computer drive to provide access to a drive connector, the carrier comprising:
    a frame dimensioned to receive a computer drive and define a computer drive position with respect to a first plane of the frame, the frame having a connector end dimensioned to accommodate a drive connector, and the frame having a first slot towards or in the connector end;
    a first lever pivotally connected to the frame at a first pivot point and having a first lifting pin distanced a radius from the first pivot point, the first lifting pin, first pivot point, radius, and first slot being dimensioned so that as the first lever pivots from a closed position substantially adjacent to the frame to an open position away from the frame the first lifting pin moves in a first direction through the first slot, a component of the first direction being away from the first plane.

2. The carrier of claim 1, the frame having a first side face and a second side face, the first side face connected to the connector end forming a first frame corner, the second side face connected to the connector end forming a second frame corner, and the first pivot point and first slot being located on the first side face, the carrier further comprising a second lever pivotally connected to the frame at a second pivot point on the second side face and having a second lifting pin distanced the radius from the second pivot point, the second lifting pin, second pivot point, and a second slot on the second side face being dimensioned so that as the second lever pivots from a closed position substantially adjacent to the frame to an open position away from the frame the second lifting pin moves in the first direction through the second slot.

3. The carrier of claim 2, the first and second levers being connected by a cross member.

4. The carrier of claim 3, the first and second levers and the cross member each having a flange, one or more of the flanges dimensioned to contact a computer drive when a computer drive is positioned in the defined computer drive position and the first and second levers are in the closed position.

5. The carrier of claim 4, the carrier further comprising a structure, the structure separating the frame a distance from the chassis.

6. The carrier of claim 5, the structure having first and second rails aligned substantially parallel to the first and second side faces.

7. The carrier of claim 6, the frame having a first latch element and the cross member having a second latch element, the first and second latch elements, when engaged, maintaining the first and second levers in the closed position.

8. The carrier of claim 7, the first and second latch elements, when latched, dimensioned such that pressure between the frame and a computer drive in the defined computer drive position is created.

9. The carrier of claim 1 further comprising an axle pivotally connecting the first lever to the frame, a second lever pivotally connected to the frame by the axle at a second pivot point and having a second lifting pin distanced the radius from the second pivot point, the axle connecting the first and second lifting levers such that the first and second lifting levers pivot at the same time through the same range, the second lifting pin, second pivot point, radius, and second slot being dimensioned so that the pivoting of the first lever from the closed position to the open position moves the first lifting pin in the first direction through the first slot and moves the second lifting pin in the first direction through the second slot.

10. The carrier of claim 9, the first lever having a flange, the flange dimensioned to contact a computer drive when a computer drive is positioned in the defined computer drive position and the first lever is in the closed position.

11. The carrier of claim 10, the carrier further comprising a structure, the structure separating the frame a distance from the chassis.

12. The carrier of claim 11, the frame having a first latch element and the first lever having a second latch element, the first and second latch elements, when engaged, maintaining the first lever in the closed position.

13. The carrier of claim 12, the first and second latch elements located at the end of the frame opposing the connector end.

14. The carrier of claim 13, the first and second latch elements, when latched, dimensioned such that the pressure between the frame and a computer drive in the defined computer drive position is created.

15. A chassis for positioning and cooling a plurality of computer drives, the chassis comprising:
    a plurality of carriers for accessing and holding a corresponding plurality of computer drives within the chassis, each carrier of the plurality comprising:
        a frame dimensioned to receive a computer drive and define a computer drive position with respect to a first plane, the frame having a connector end dimensioned to accommodate a drive connector, and the frame having a first slot towards or in the connector end;
        a first lever pivotally connected to the frame at a first pivot point and having a first lifting pin distanced a radius from the first pivot point, the first lifting pin, first pivot point, radius, and first slot being dimensioned so that as the first lever pivots from a closed position substantially adjacent to the frame to an open position away from the frame the first lifting pin moves in a first direction through the first slot, a component of the first direction being away from the first plane; and a structure, the structure separating the frame a distance from the chassis;

and one or more fans positioned in the chassis with communicable access to the distance separating each carrier from the chassis.

16. The carrier of claim 15, the structure including a first rail and a second rail for each carrier, the first and second rails distancing each carrier from the chassis, the first and second rails aligned with respect to a direction of a flow of air.

17. The carrier of claim 16, the frame having a first latch element and the first lever having a second latch element, the first and second latch elements engaging to maintain the first lever in the closed position, the first and second latch elements, when latched, dimensioned to increase contact pressure between the frame and a computer drive in the defined computer drive position.

18. A chassis for positioning a plurality of computer drives in a minimal area, the chassis comprising:

a plurality of carriers holding and providing access to a corresponding plurality of computer drives within the chassis, each carrier of the plurality comprising:

a frame dimensioned to receive a computer drive and define a computer drive position with respect to a first plane, the frame having a connector end dimensioned to accommodate a drive connector, and the frame having a first slot towards or in the connector end; and a first lever pivotally connected to the frame at a first pivot point and having a first lifting pin distanced a radius from the first pivot point, the first lifting pin, first pivot point, radius, and first slot being dimensioned so that as the first lever pivots from a closed position substantially adjacent to the frame to an open position away from the frame the first lifting pin moves in a first direction through the first slot, a component of the first direction being away from the first plane; and a first drive connector on a first computer drive in a first carrier of the plurality and a second computer drive in a second carrier of the plurality, the first carrier and the second carrier positioned so that, as the first lever of the first carrier moves to the open position the first lifting pin of the first carrier moves through the first slot of the first carrier and urges a connector end of the first computer drive away from the first plane, the first drive connector becomes accessible for connecting to or disconnecting from only as the first lever of the first carrier approaches the open position.

19. The carrier of claim 18, each frame having a first side face and a second side face and each first pivot point and first slot being located on the first side face, each carrier further including a second lever pivotally connected to the frame at a second pivot point and having a second lifting pin distanced the radius from the second pivot point, the second lifting pin, second pivot point, and second slot being dimensioned so that as the second lever pivots from a closed position substantially adjacent to the frame to an open position away from the frame the second lifting pin moves in the first direction through the second slot, and the second pivot point and second slot being located on the second side face.

20. The carrier of claim 19, the first and second levers being connected by a cross member, the first and second levers and the cross member each having a flange, one or more of the flanges dimensioned to contact the computer drive when the computer drive is positioned in the defined computer drive position and the first and second levers are in the closed position.

* * * * *